United States Patent
Mueller et al.

(10) Patent No.: US 8,371,116 B2
(45) Date of Patent: Feb. 12, 2013

(54) STAMPED CENTERING PLATE

(75) Inventors: Rolf A. Mueller, Wooster, OH (US); Randy L. Keller, Polk, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 13/295,358

(22) Filed: Nov. 14, 2011

(65) Prior Publication Data

US 2012/0055754 A1 Mar. 8, 2012

Related U.S. Application Data

(63) Continuation of application No. PCT/DE2010/000692, filed on Jun. 17, 2010.

(60) Provisional application No. 61/225,696, filed on Jul. 15, 2009.

(51) Int. Cl.
*F16D 33/00* (2006.01)
(52) U.S. Cl. .................................................... 60/365
(58) Field of Classification Search ............... 60/365, 60/366
See application file for complete search history.

(56) References Cited

U.S. PATENT DOCUMENTS

| | | | | |
|---|---|---|---|---|
| 2,431,855 A | * | 12/1947 | Zeidler | 60/366 |
| 5,980,208 A | * | 11/1999 | Szuba | 60/330 |
| 6,125,980 A | | 10/2000 | Ruth et al. | |
| 2007/0137977 A1 | | 6/2007 | Peri et al. | |

FOREIGN PATENT DOCUMENTS

| | | |
|---|---|---|
| EP | 0549824 | 7/1993 |
| GB | 2076908 | 12/1981 |
| GB | 2098702 | 11/1982 |
| WO | 2007124714 | 11/2007 |

* cited by examiner

*Primary Examiner* — F. Daniel Lopez
(74) *Attorney, Agent, or Firm* — Simpson & Simpson, PLLC

(57) ABSTRACT

The invention relates to a stamped centering plate (10) for a torque converter with a first annular surface (12) having at least one arcuate slot (16), a second annular surface (14) opposite the first annular surface, and at least one arcuate segment (20) axially protruding downward from the second annular surface. The slot has an inner radius and an outer radius, the segment has an inner radius and an outer radius, and at least one of the slot radii is equal to at least one of the segment radii. In an example embodiment of the invention, the segment comprises material displaced to form the slot.

11 Claims, 4 Drawing Sheets

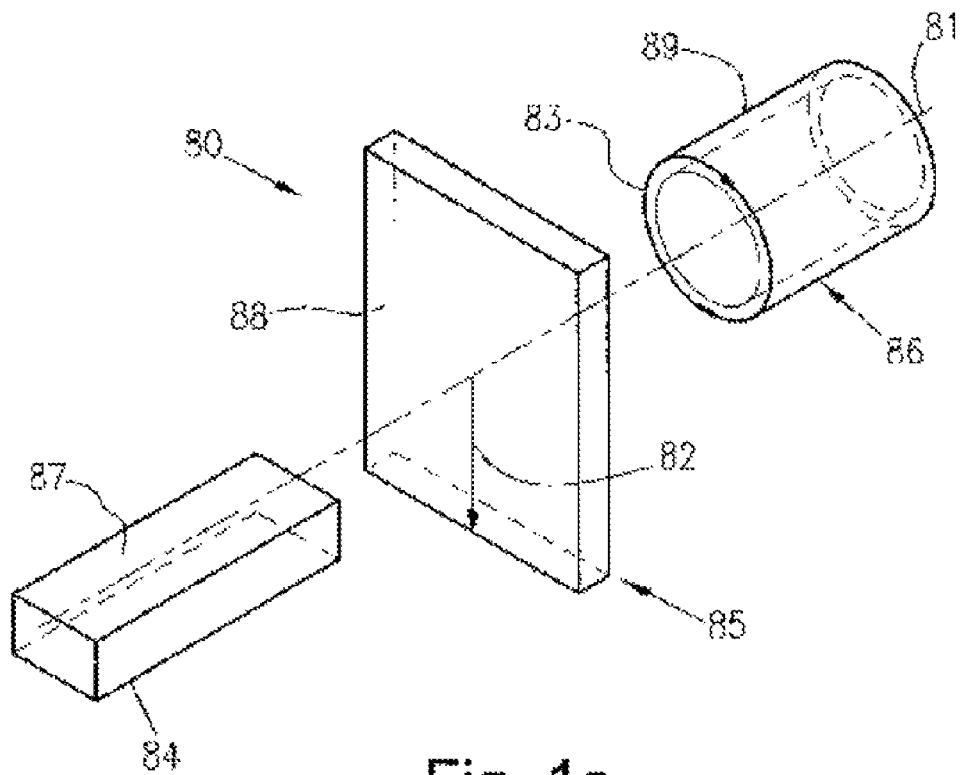
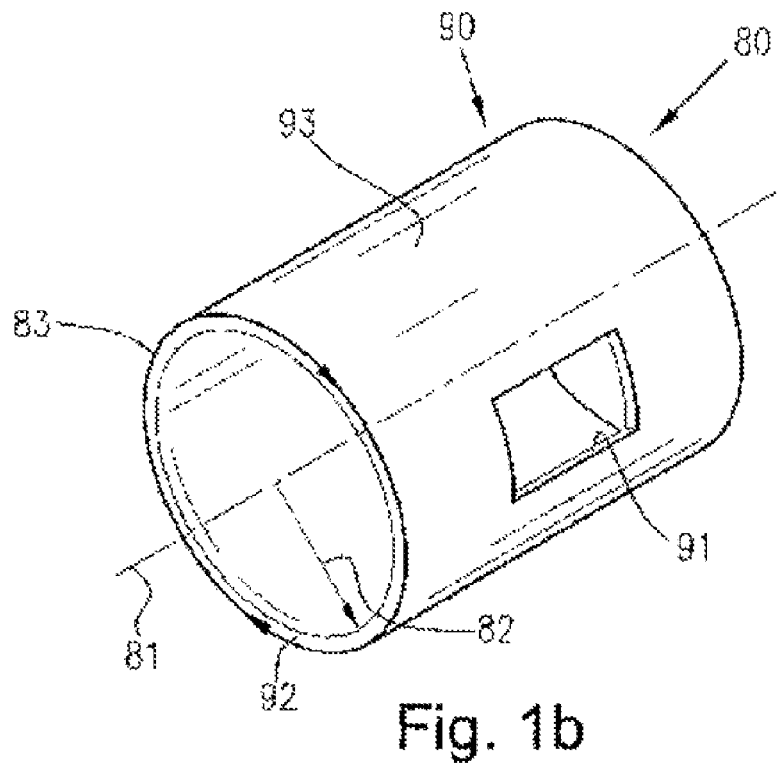

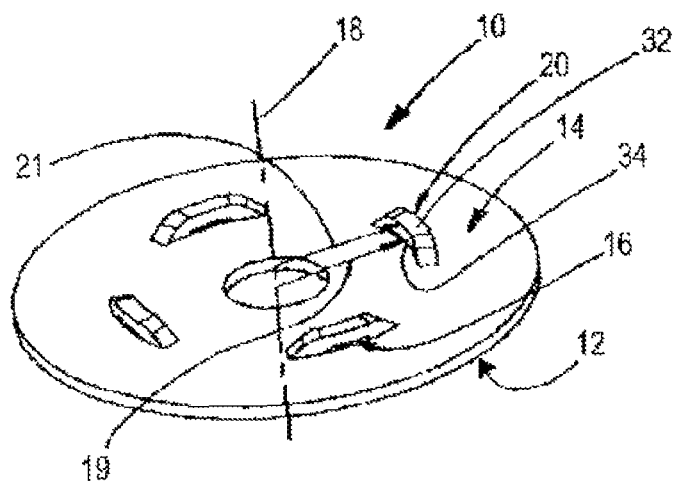
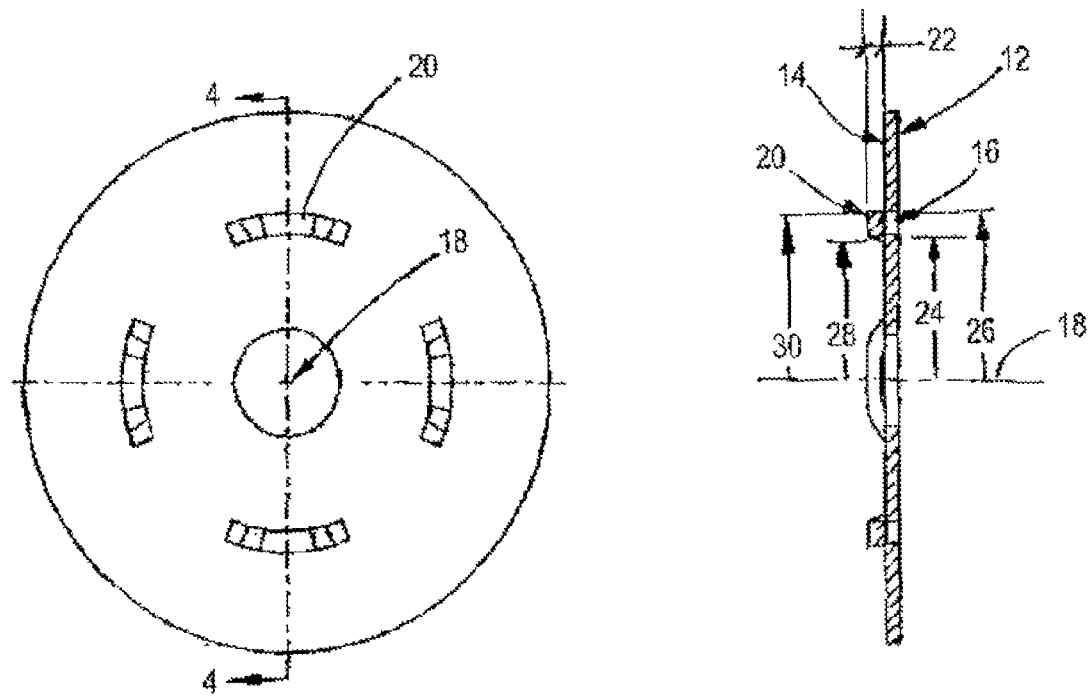

STAMPED CENTERING PLATE

CROSS-REFERENCE TO RELATED APPLICATIONS

This application is filed under 35 U.S.C. §120 and §365(c) as a continuation of International Patent Application PCT/DE2010/000692, filed Jun. 17, 2010, which application claims priority from U.S. Provisional Patent Application No. 61/225,696, filed Jul. 15, 2009, which applications are incorporated herein by reference in their entirety.

FIELD OF THE INVENTION

The invention relates generally to a stamped centering plate for a torque converter, and more specifically to a stamped centering plate with lanced centering features.

BACKGROUND OF THE INVENTION

Stamped side plates for torque converters are known. One example is shown in commonly-held United States Patent Application Publication No. US 2007/0137977 A1.

BRIEF SUMMARY OF THE INVENTION

Example aspects of the present invention broadly comprise a stamped centering plate for a torque converter with a first annular surface having at least one arcuate slot, a second annular surface opposite the first annular surface, and at least one arcuate segment axially protruding from the second annular surface. The slot has an inner radius and an outer radius, the segment has an inner radius and an outer radius, and at least one of the slot radii is equal to at least one of the segment radii. In an example embodiment of the invention, the segment comprises material displaced to form the slot.

The segment may be formed by material displaced to form the slot. In an example embodiment of the invention, the inner and outer slot radii are equal to the inner and outer segment radii, respectively. The at least one slot may include at least three slots and the at least one arcuate segment may include at least three corresponding arcuate segments axially aligned with the at least three slots.

In an example embodiment of the invention, a height of the segment relative to the annular surface is selected to ensure a bearing remains centered by the segment when the torque converter experiences a ballooned state. The centering plate may be a side plate for a stator of the torque converter, a turbine hub for the torque converter, or a pump hub for the torque converter.

Other example aspects of the present invention broadly comprise a stamped centering plate assembly for a torque converter with an annular centering plate having a plurality of arcuate protrusions, and a bearing having an inner circumference and an outer circumference. The bearing is radially positioned by the protrusions, and a radial wall of the centering plate adjacent to the bearing is continuous between the protrusions and the inner circumference or between the protrusions and the outer circumference.

In an example embodiment of the invention, the bearing has an inside circumferential surface and the protrusions each have an outside circumferential surface, and a radial position of the bearing is maintained by contact between the inside surface and the outside surfaces. In another example embodiment of the invention, the bearing has an outside circumferential surface and the protrusions each have an inside circumferential surface, and a radial position of the bearing is maintained by contact between the outside surface and the inside surfaces.

Other example aspects of the present invention broadly comprise a method of forming a centering plate for a torque converter including the steps of blanking an annular disk; and axially displacing an arcuate segment with an inner radius and an outer radius out of the disk. At least one of the inner radius or the outer radius is equal to a radius of a slot formed in the disk by the displaced segment. In some example embodiments of the invention, the arcuate segment is axially displaced by a punch having inner and outer radii substantially the same as respective inner and outer radii of the segment. The disk is supported by a die block with a slot having inner and outer radii substantially the same as respective inner and outer radii of the segment. Clearance between inner and outer punch radii and respective inner and outer slot radii is less than 0.5 mm. In an example embodiment of the invention, the clearance is about 0.05 mm.

BRIEF DESCRIPTION OF THE DRAWINGS

The nature and mode of operation of the present invention will now be more fully described in the following detailed description of the invention taken with the accompanying drawing figures, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application;

FIG. 2 is a perspective view of a stamped centering plate according to an example aspect of the invention;

FIG. 3 is a top view of the centering plate of FIG. 2;

FIG. 4 is a section view of the centering plate of FIG. 3 taken generally along line 4-4 in FIG. 3;

DETAILED DESCRIPTION OF THE INVENTION

Figure 5:
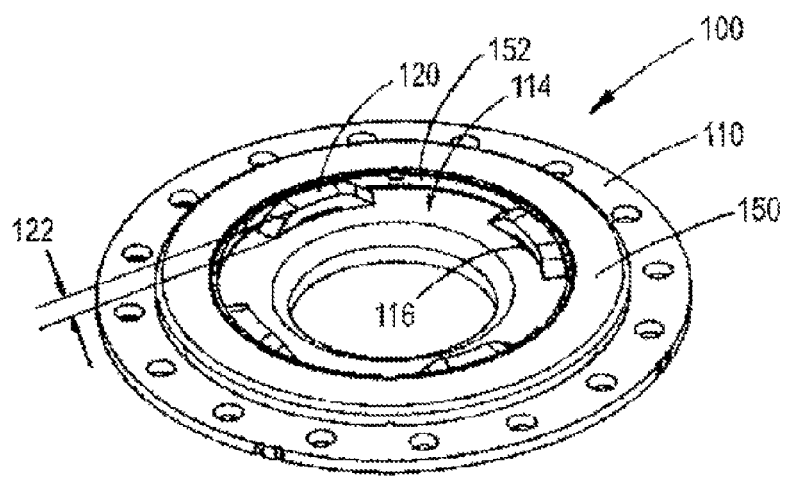
FIG. 5 is a perspective view of a stamped centering plate assembly according to an example aspect of the invention shown assembled with a bearing.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

The following description is made with reference to FIGS. 2-4. FIG. 2 is a perspective view of a stamped centering plate according to an example aspect of the invention. FIG. 3 is a top view of the centering plate shown in FIG. 2. FIG. 4 is a section view of the centering plate in FIG. 3 taken generally along line 4-4 in FIG. 3. Centering plate 10 includes annular surfaces 12 and 14. Surface 12 includes at least one slot 16. In an example embodiment of the invention, slot 16 is an arcuate slot. That is, slot 16 has an arcuate form with a center of the arc disposed proximate to central axis 18 for centering plate 10. In other words, radius 19 of slot 16 extends between central axis 18 and slot 16. Slot 16 extends in a generally circumferential direction through surface 12

Surface 14, disposed opposite surface 12, includes segment 20. Segment 20 axially protrudes from surface 14 by distance 22. In an example embodiment of the invention, segment 20 is an arcuate segment. That is, segment 20 has an arcuate form with a center of the arc disposed proximate to central axis 18 for centering plate 10. In other words, radius 21 of segment 20 extends between central axis 18 and segment 20. Segment 20 extends in a generally circumferential direction along surface 14.

Slot 16 includes inner radius 24 and outer radius 26, and segment 20 includes inner radius 28 and outer radius 30. In an example embodiment of the invention, at least one of radii 24 and 28 or radii 26 and 30 are equal. For example, inner radius 24 for slot 16 may be concentric with and axially aligned with inner radius 28 for segment 20. Likewise, outer radius 26 for slot 16 may be concentric with and axially aligned with outer radius 30 for segment 20.

Slot 16 may be created by axially displacing material from surface 12. Segment 20 may be formed by axially displacing material from surface 14. In an example embodiment of the invention, segment 14 includes material displaced to form slot 16. That is, top surface 32 of segment 20 includes material displaced from surface 14 and bottom surface 34 of segment 20 includes material displaced from surface 12. In an example embodiment of the invention, segment 20 includes all material displaced to form slot 16. That is, slot 16 is created by axially displacing material to form segment 20.

Centering plate 10 includes a plurality of slots 16 and segments 20. Although centering plate 10 is shown with a particular number of slots 16 and segments 20, centering plate 10 may include other numbers of slots 16 and segments 20. Generally, at least 3 slots and segments are preferred to ensure proper centering, as explained below.

Centering plate 10 is generally a component of a torque converter. In some example embodiments of the invention, centering plate 10 is a side plate for a stator of the torque converter.

Figure 6:
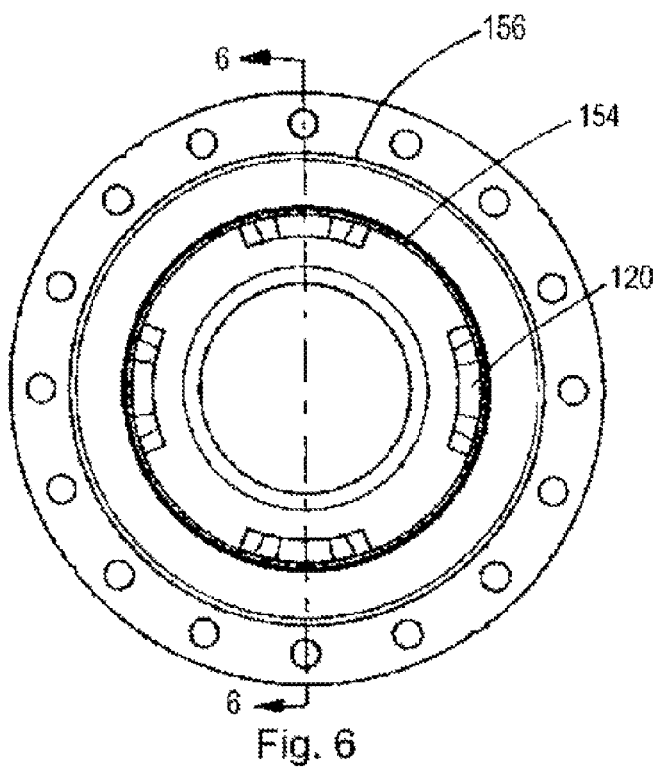
FIG. 6 is a top view of the assembly shown in FIG. 6.

The following description is made with reference to FIGS. 4-6. FIG. 4 is a perspective view of a stamped centering plate assembly according to an example aspect of the invention shown assembled with a bearing. FIG. 5 is a top view of the assembly shown in FIG. 5. FIG. 6 is a section view of the assembly shown in FIG. 5 taken generally along line 6-6 in FIG. 5.

Assembly 100 includes centering plate 110 and bearing 150. Segment 120 axially extends from annular surface 114 by distance 122. Bearing 150 is centered, or radially positioned, by centering plate 110, specifically by segments 120. Radial wall 114 of centering plate 110 adjacent to bearing 150 is continuous between protrusions 120 and inner circumference 154 and between protrusions 120 and outer circumference 156. In an example embodiment of the invention (not shown), wall 114 is continuous between protrusions 120 and only one of inner circumference 154 and outer circumference 156.

Height 122 is selected to ensure bearing 150 remains centered by segment 120 when the torque converter (not shown) experiences a ballooned state. For example, under high rotational speeds, increased pressure in the torque converter results in axial displacement of the torque converter casing (not shown), with the increased distance between the radial walls of the casing allowing axial movement of the components therein. Height 122 is selected such that segments 120 are still axially overlapped with inside surface 152 of bearing 150 when the casing experiences maximum axial displacement and the bearing and centering plate become axially separated from one another.

In an example embodiment of the invention, bearing 150 includes inside circumferential surface 152 and protrusions 120 each comprise outside circumferential surface 136. The radial position of bearing 150 is adjusted by contact between inside surface 152 and outside surfaces 136. In another example embodiment of the invention (not shown), bearing 150 includes an outside circumferential surface and protrusions 120 each comprise an inside circumferential surface, and the radial position of the bearing is adjusted by contact between the outside surface and the inside surfaces. That is, the bearing is disposed radially inside of the protrusions.

Assembly 100 is generally disposed within a torque converter. For example, assembly 100 may provide a thrust surface between an impeller and stator, between a stator and turbine hub, or between a turbine hub and a cover. Although specific applications of assembly 100 are disclosed, other applications within a torque converter or other powertrain component may exist and should be considered within the scope of the invention.

Figure 7:
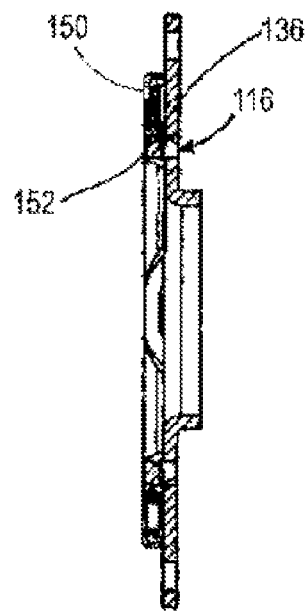
FIG. 7 is a section view of the assembly shown in FIG. 6 taken generally along line 7-7 in FIG. 6.
Figure 8:
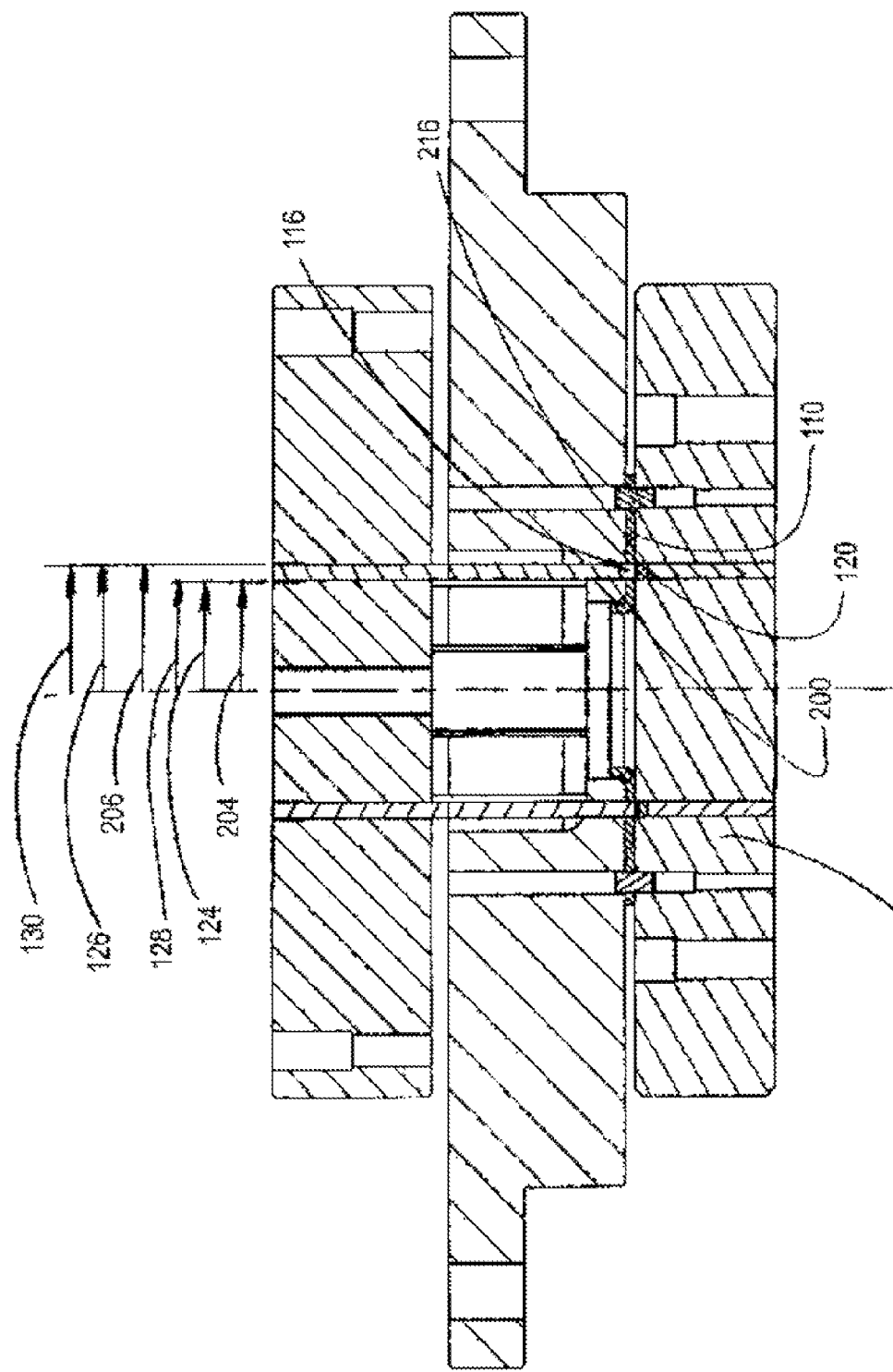
FIG. 8 is a section view of a stamping die used to manufacture a centering plate.

The following description is made with reference to FIG. 7. FIG. 7 is a section view of a stamping die used to manufacture a centering plate. According to an example aspect of the invention, a method of forming a centering plate for a torque converter is provided. The method includes the steps of blanking annular disk 110, axially displacing arcuate segment 120 (with punch 200, for example) having inner radius 204 and outer radius 206 out of disk 110. In an example embodiment of the invention, at least one of inner radius 204 or outer radius 206 is equal to radius 124 and/or 126 of slot 116 formed in disk 110 by displaced segment 120.

In some example embodiments of the invention, arcuate segment 120 is axially displaced by punch 200 having inner and outer radii 204 and 206 substantially the same as respective inner and outer radii 128 and 130 of segment 120. Disk 110 may be supported by die block 214 with slot 216 having inner and outer diameters substantially the same as respective inner and outer diameters 128 and 130 of segment 120. Clearance, or difference in radii, between inner and outer punch radii and respective inner and outer slot radii is less than 0.5 mm. In an example embodiment of the invention, the clearance is about 0.05 mm.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A stamped centering plate for a torque converter comprising:
   a first annular surface;
   a second annular surface opposite the first annular surface;
   at least one arcuate slot passing through the plate and opening to the first and second annular surfaces; and,
   at least one arcuate segment protruding from the second annular surface such that the at least one segment is separated from the second annular surface in a first direction parallel to an axis for the centering plate and including first and second circumferential ends one of which is connected to the first annular surface, wherein:
      at least a portion of the at least one arcuate segment is aligned with the at least one arcuate slot such that a line parallel to the axis passes through the at least one segment and the at least one arcuate slot;
      the at least one slot has a first inner radius and a first outer radius, the first inner radius less than the first outer radius;
      the at least one segment has a second inner radius and a second outer radius, the second inner radius less than the second outer radius;
      the centering plate is a side plate for a stator of the torque converter; and
         the first and second inner radii are equal; or,
         the first and second outer radii are equal.

2. The centering plate of claim 1, wherein the segment comprises material displaced to form the slot.

3. The centering plate of claim 1, wherein the segment is formed by material displaced to form the slot.

4. The centering plate of claim 1, wherein:
   the at least one slot comprises at least three slots;
   the at least one arcuate segment comprises at least three corresponding arcuate segments; and
   each of the at least three corresponding arcuate segments is aligned, in the first direction, with a respective slot from the at least three slots.

5. The centering plate of claim 1, wherein a height of the segment relative to the second annular surface is selected to ensure a bearing remains centered by the segment.

6. A method of forming a centering plate for a torque converter comprising the steps of:
   blanking an annular disk including first and second oppositely facing annular surfaces;
   displacing an arcuate segment having first and second circumferential ends, a second circumferential end, a first inner radius, and a first outer radius out of the disk such that the arcuate segment is separated from the disk in a line parallel to a axis for the centering plate, the first inner radius less than the first outer radius, and each of the first and second circumferential ends are connected to the first annular surface; and,
   forming a slot passing through the plate, axially aligned with the arcuate segment such that a line parallel to the axis passes through the slot and the arcuate segment, and opening to the first and second surfaces, wherein:
      the first and second inner radii are equal; or,
      the first and second outer radii are equal.

7. The centering plate of claim 1, wherein each of the first and second circumferential ends are connected to the first annular surface.

8. The method of claim 6, wherein the centering plate is a side plate for a stator of the torque converter.

9. The method of claim 6 further comprising selecting a height of the segment relative to the second annular surface to ensure a bearing remains centered by the segment.

10. A stamped centering plate for a torque converter comprising:
    a first annular surface;
    a second annular surface opposite the first annular surface;
    at least one arcuate slot passing through the plate and opening to the first and second annular surfaces; and,
    at least one arcuate segment protruding from the second annular surface such that the at least one segment is separated from the second annular surface in a direction parallel to an axis for the centering plate and including first and second circumferential ends one of which is connected to the first annular surface, wherein:
       at least a portion of the at least one arcuate segment is aligned with the at least one arcuate slot such that a line parallel to the axis passes through the at least one segment and the at least one arcuate slot;
       the at least one slot has a first inner radius and a first outer radius, the first inner radius less than the first outer radius;
       the at least one segment has a second inner radius and a second outer radius, the second inner radius less than the second outer radius;
       a height of the segment relative to the second annular surface is selected to ensure a bearing remains centered by the segment; and,
          the first and second inner radii are equal; or,
          the first and second outer radii are equal.

11. The centering plate of claim 10, wherein each of the first and second circumferential ends are connected to the first annular surface.

* * * * *